Patented Oct. 28, 1930

1,779,825

UNITED STATES PATENT OFFICE

OSCAR ASA PICKETT, OF KENVIL, NEW JERSEY, ASSIGNOR TO HERCULES POWDER COMPANY, OF WILMINGTON, DELAWARE, A CORPORATION OF DELAWARE

MANUFACTURE OF NITROSTARCH

No Drawing.  Application filed May 4, 1926.  Serial No. 106,746.

My invention relates to the manufacture of nitrostarch and more particularly to a method of manufacture by which the nitration of the starch will be uniformly and more easily accomplished and greatly improved products suitable for use in the commercial arts, obtained.

The nitration of starch has heretofore been well known, and has been accomplished by various methods, for use in connection with the production of explosives, as for example, dynamite, and for such purpose has been found satisfactory.

However, in the production of nitrated starch heretofore, a product of the highest possible nitrogen content has been sought and such product is known to contain a substantial proportion of unnitrated or partially nitrated grains of starch, or where completely and uniformly nitrated to be of such nitrogen content and solubility that while its utility as an ingredient of explosives is not effected, it is unsuited for a variety of uses, other than as an explosive for which it might otherwise be adaptable.

The fact that the nitrostarch heretofore produced, by known methods, contains unnitrated or only partially nitrated grains, is readily determinable by the well known iodine test, and it is believed that the failure to secure uniform nitration arises from the formation of conglomerates, during the nitration, which resist penetration of the nitrating acids.

Nitrostarch as heretofore produced, is for example, unfit for use in the commercial arts, as in the production of lacquers, since the unnitrated or partially nitrated grains or the grains of too high or too low nitration cannot be dissolved, in the usual solvents, and remain in a nitrostarch solution as a turbidity or cloud, thus rendering the solution valueless.

Nitrostarch as heretofore produced is, as is well known, difficult to purify and its proper stabilization is also only accomplished with difficulty and requires many hours of washing or boiling treatments, or both; as a result it has heretofore been found necessary in many instances to purify the starch before nitration.

Now it is the object of my invention to provide a method which will enable the production, from ordinary grades of starch, of uniformly nitrated starch, which may be readily dissolved and which will form a clear solution with a wide range of solvents, for example, such as are desirable for use in the preparation of lacquers. Further, to produce a nitrostarch which will lend itself readily to purification and proper stabilization.

My invention more particularly involves the inclusion with the nitrating acids of an ingredient, such as water, in an amount sufficient to swell the grains of starch, prior to, or during nitration so that the nitrating acids may readily penetrate the grains and effect more easily a uniform nitration of the starch to the desired degree and render its purification and stabilization more easy and rapid. Further, my invention involves nitration under a substantially wider range of temperature than heretofore used which allows a positive control of viscosity in the nitrostarch produced.

Having now indicated, in a general way, the nature and purpose of my invention, I will proceed to a detailed description of a preferred method of producing nitrostarch in accordance therewith.

In carrying out the process in accordance with my invention, I prepare a mixture of nitrating acids, for example, sulphuric acid and nitric acid, in suitable proportions to effect the nitration desired and mix therewith water in an amount in excess of ten percent of the total mixture.

The amount of water included in the mixture of nitrating acids may vary from ten percent to fifteen percent of the amount of the mixture of acids and water.

The following are examples of typical compositions for nitrating mixtures, for use in carrying out my invention, which I have found to produce satisfactory results:

|   |   |
|---|---|
| 64% | 67% |
| 24% | 18% |
| 12% | 15% |
| 100% | 100% |

A nitrating mixture as above described is placed in a nitrator of usual structure, having a cooling jacket, through which is circulated a cooling liquid, and provided with suitable stirrers. The nitrator is preferably about two-thirds filled with nitrating mixture.

Heat is then applied and the nitrating mixture brought to a desired temperature, which according to my invention may be from 20° C.–30° C. The starch, previously dried, but which need not be especially purified and may, for example, be cornstarch, is then sifted into the nitrator through a screen and beaten beneath the surface of the nitrating mixture, by operation of the stirrers with which the nitrator is equipped. The starch is entered into the nitrator at a rate such that the heat generated by the nitration can be carried off by the liquid in the cooling jacket without permitting the temperature of the mixture within the nitrator to rise above that desired.

After the desired amount of starch has been added to the nitrating mixture in the nitrator (about one part of starch to ten parts of nitrating mixture) agitation, through the medium of the stirrers, is continued for such time as is required to insure thorough and uniform nitration of the last portions of the starch added.

When nitration is complete, the nitrostarch-acid mixture is run into a large volume of cold water and allowed to settle. The acid wash water is drawn off and additional warm or hot water washes are given, until all the acids have been removed from the nitrostarch. If desired, after nitration is complete the nitrostarch is filtered from the nitrostarch-acid mixture by a suitable filter, the spent acids delivered to an acid recovery and the nitrostarch washed with water, either warm or cold, until all acids have been removed.

The nitrostarch is then subjected to neutralizing washes with a suitable alkali, stabilized and finally dried, or otherwise dehydrated.

In the treatment of the nitrated starch it may be boiled with live steam at atmospheric pressure for longer periods than specified above, which will have the effect of lowering the viscosity of the nitrated starch.

It will now be observed that the process of my invention is not dependent upon the use of any particular apparatus and that it comprises essentially the swelling of the starch grains to permit penetration of the nitrating acids. More particularly the nitration of starch with a mixture of nitrating acids containing in excess of ten percent of water, the water acting to swell the grains of starch and permit complete permeation of the starch by the nitrating acids. Further, that the process of nitration in accordance with my invention permits wide and definite control of the nitrogen content and viscosity of the product through control of nitrating temperature and water content in excess of ten per cent in the nitrating mixture.

The nitrostarch, of desired degree of nitration, produced by my novel process is uniformly nitrated, containing no unnitrated or partially nitrated grains. The nitrostarch has a nitrogen content of from about 10.0% to about 12.6% and is soluble not only in the usual solvents for nitrocotton, as for example acetone, ethyl, and amyl acetate, etc. and mixtures thereof, but in a wider range, including anhydrous ethyl alcohol 95% ethyl alcohol, mixtures of toluol and 95% ethyl alcohol, etc., without the formation of a cloud or turbidity, and will form free flowing solutions of concentrations up to 35% plus of nitrated starch. Thus, a nitrostarch is produced which is adapted for a wide variety of uses, including the production of lacquers, for which nitrostarch as heretofore produced was wholly unadaptable. Further, the nitrostarch produced by my novel process lends itself readily to purification and proper stabilization, since the swelled grains may be easily washed and treated with stabilizers, thus permitting the use of ordinary grades of starch, as cornstarch, and avoiding the necessity of purifying the starch before nitrating.

When in the foregoing specification and in the appended claims I refer to uniformly nitrated starch, I intend nitrated starch all the grains of which are uniformly nitrated to the desired degree, that is, nitrated starch containing no unnitrated grains and no grains only partially nitrated relative to the degree of nitration desired.

Having now fully described my invention, what I claim and desire to protect by Letters Patent is:—

1. A nitrated starch of relatively low viscosity and a high degree of solubility and stabilization prepared by the simultaneous swelling and nitration of starch of normal density.

2. The method of producing nitrostarch which includes treating starch of normal density with a mixture of acids, one of which is nitric acid, and water, the proportion of acids and water being such that the mixture will act to simultaneously swell and nitrate the starch.

3. The method of producing nitrostarch which includes treating starch of normal density with a mixture of acids, one of which is nitric acid, and water in excess of ten per cent, whereby the starch will be simultaneously swelled and nitrated.

4. The method of producing nitrostarch which includes treating starch of normal density with a mixture of acids, one of which is nitric acid, and water in excess of ten per cent, whereby the starch will be simultaneously swelled and nitrated and subsequently boiling the starch with live steam.

5. The method of producing nitrostarch which includes treating starch of normal density with a mixture of acids, one of which is nitric acid, and water in an amount from ten per cent to fifteen per cent.

6. The method of producting nitrostarch which includes subjecting starch of normal density to heat at a temperature within the range about 20° C.–30° C. in the presence of a mixture of acids, one of which is nitric acid, and water in excess of ten per cent.

In testimony of which invention, I have hereunto set my hand, at Kenvil, N. J., on this 29th day of April, 1926.

OSCAR ASA PICKETT.